(12) United States Patent
Terada et al.

(10) Patent No.: US 6,598,476 B2
(45) Date of Patent: Jul. 29, 2003

(54) ANGULAR VELOCITY SENSOR

(75) Inventors: Jiro Terada, Osaka (JP); Katsunori Matsubara, Osaka (JP); Takeshi Yamamoto, Shiga (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 10/100,737

(22) Filed: Mar. 19, 2002

(65) Prior Publication Data

US 2002/0157466 A1 Oct. 31, 2002

(30) Foreign Application Priority Data

Mar. 22, 2001 (JP) ........................................ 2001-082157

(51) Int. Cl.[7] .............................. G01C 19/00; G01P 9/00
(52) U.S. Cl. ................................................. 73/504.16
(58) Field of Search ........................ 73/504.16, 504.12; 310/321, 367, 370, 366

(56) References Cited

U.S. PATENT DOCUMENTS 5,533,397 A  * 7/1996 Sugitani et al. .......... 73/504.16
5,945,599 A    8/1999 Fujiyoshi et al.
5,992,233 A  * 11/1999 Clark ...................... 73/514.35
6,028,332 A    2/2000 Kano et al.
6,437,483 B2 * 8/2002 Kikuchi et al. ............. 310/321

FOREIGN PATENT DOCUMENTS

JP    10-170276    6/1998
JP    11-26777     1/1999

* cited by examiner

Primary Examiner—Richard A. Moller
(74) Attorney, Agent, or Firm—RatnerPrestia

(57) ABSTRACT

Here disclosed is an angular velocity sensor with much accuracy, not allowing other vibration components to mix into the Coriolis force component. The angular velocity sensor contains a first through a fifth beams: the first, the second, and the third beams have a length of substantially the same and disposed in a substantially parallel arrangement on a substantially the same plane—with the first beam placed between the second and the third; the fourth connects each one end of the first through the third, while the fifth connects each other end of them. The first beam is supportively fixed at its mid-portion. The first beam serves as a detector; the second serves as a driver; and the third serves as a monitor.

14 Claims, 11 Drawing Sheets

ANGULAR VELOCITY SENSOR

FIELD OF THE INVENTION

The present invention relates to an angular velocity sensor, more particularly, relates to the angular velocity sensor employed for the attitude control and navigation of moving objects such as an airplane, an automobile, a robot, a ship, or other vehicles; for preventing still and vided cameras shake; and for the remote control for remotely operated equipment.

BACKGROUND OF THE INVENTION

As an angular velocity sensor, the typical one is disclosed in Japanese Patent Non-examined Publication No. H10-170276 (the corresponding U.S. Pat. No. 5,945,599). The sensor has a mass portion as a vibrator and electrodes facing to the mass portion. In the structure, an electrostatic attraction generated between the electrodes vibrates the mass portion. When an angular velocity is applied to the mass portion, the Coriolis force developed at the mass portion acts in a direction at right angles to the axis of the applied velocity and to the vibrating direction of the mass portion. The Coriolis force displaces the mass portion, by which the distance between the facing electrodes changes. That is, a capacitance between the electrodes changes due to the displacement of the mass portion. Through the capacitance, the angular velocity sensor detects information on the angular velocity.

As another example of the prior-art sensor, Japanese Patent Non-examined Publication No. H11-26777 (the corresponding U.S. Pat. No. 6,028,332) discloses a semiconductor-type angular velocity sensor. In a beam structure similarly formed to the aforementioned type, a mass portion is driven by an electrostatic attraction. At this moment, a strain gauge disposed at the beam structure detects a displacement in the mass portion brought by the Coriolis force.

In the former example of the prior-art sensors described above, the angular velocity information is obtained from a change in capacitance between the oppositely disposed electrodes. In the latter example, the information is detected by the strain gauge disposed on a beam connected to the mass portion. The both ways are based on a displacement in the mass portion by the Coriolis force when the mass portion is vibrated.

With the ways above, however, the displacement component generated from the drive of the mass portion is partly mixed into the Coriolis force component. It is therefore difficult to extract a "genuine" Coriolis force component from the mixture. In other words, the Coriolis force acting in a direction perpendicular to the vibrating mass portion is extremely smaller than the driving force on the mass portion. Therefore, it is hard to draw a distinction between vibration caused by the Coriolis force and vibration occurred in a direction different from the vibrating mass portion. Aforementioned problem has often hampered the sensor from detecting angular velocity with high accuracy.

In order to effectively drive the mass portion and the facing electrodes by electrostatic attraction, or monitor a change in a capacitance between the electrodes, the distance between the electrodes preferably ranges from 2–3 microns to 5–6 microns. However, due to an accidental intrusion of foreign matter or dust into the gap, there is a possibility of causing a short circuit between the electrodes. It causes a troublesome problem, in particular, in a structure having many electrodes formed into a comb shape for an effective drive or detection—the drive by the electrostatic attraction or the detection of the capacitance has often ended in failure by a single short circuit between the electrodes due to the entry of foreign matter.

This may be an obstacle to mass-production of the angular velocity sensor with multiple electrodes.

SUMMARY OF THE INVENTION

It is therefore the object of the present invention to provide an angular velocity sensor not allowing other vibration components, in particular, driving displacement components to mix into the Coriolis force component.

The angular velocity sensor of the present invention contains a first through a fifth beams: the first, the second, and the third beams have a length of substantially the same and are disposed in a substantially parallel arrangement on a substantially the same plane—with the first beam placed between the second and the third; the fourth connects each one end of the first through the third, while the fifth connects each other end of them. In addition, the mid-portion of the first beam is supportively fixed.

The first beam serves as a detector; the second serves as a driver; and the third serves as a monitor.

With the structure above, other vibration components are not allowed to mix into the Coriolis force component. Such a simply structured angular velocity sensor can thus detect the angular velocity with much accuracy.

DESCRIPTION OF THE PREFERRED EMBODIMENTS

First Preferred Embodiment

Figure 1:
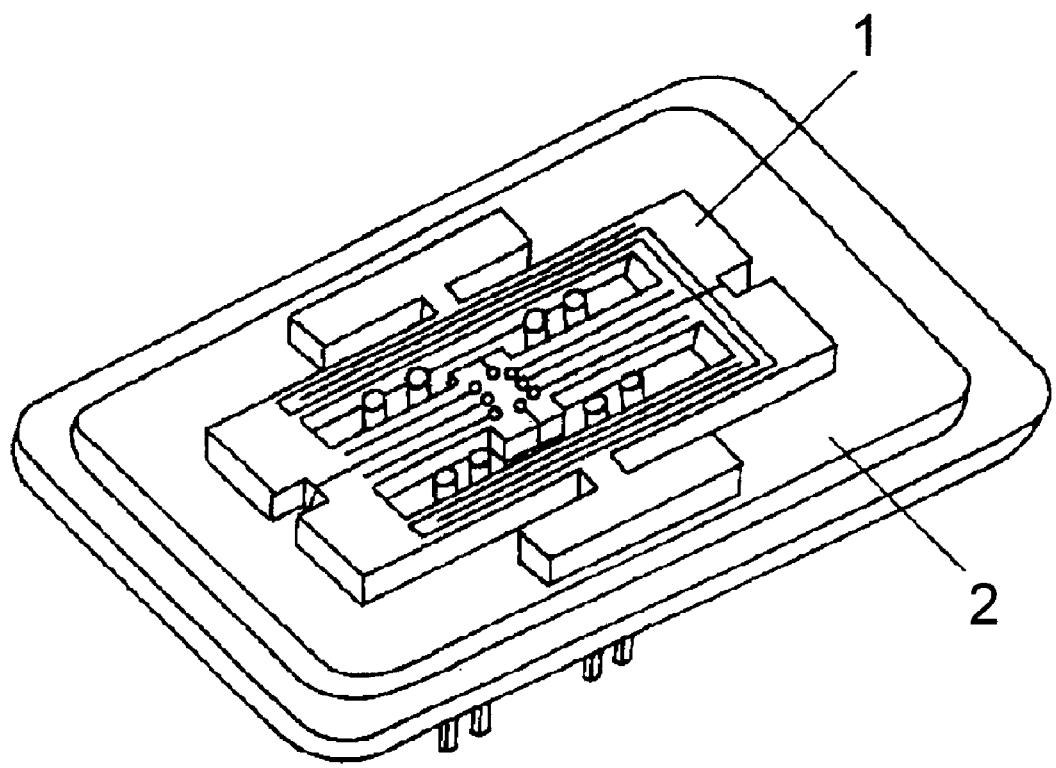
FIG. 1 is a perspective view depicting the structure of an angular velocity sensor in accordance with a first preferred embodiment of the present invention.

FIG. 1 is a perspective view depicting the structure of an angular velocity sensor in accordance with the first preferred embodiment of the present invention.

Quartz-made sensor element 1 contains a driving section and a detecting section. Airtight plate 2 for hermetically sealing is made of an alloy of cobalt, nickel, and iron. Airtight plate 2 has a length of 12 mm, a width of 8 mm, and a thickness of 0.6 mm.

Figure 2:
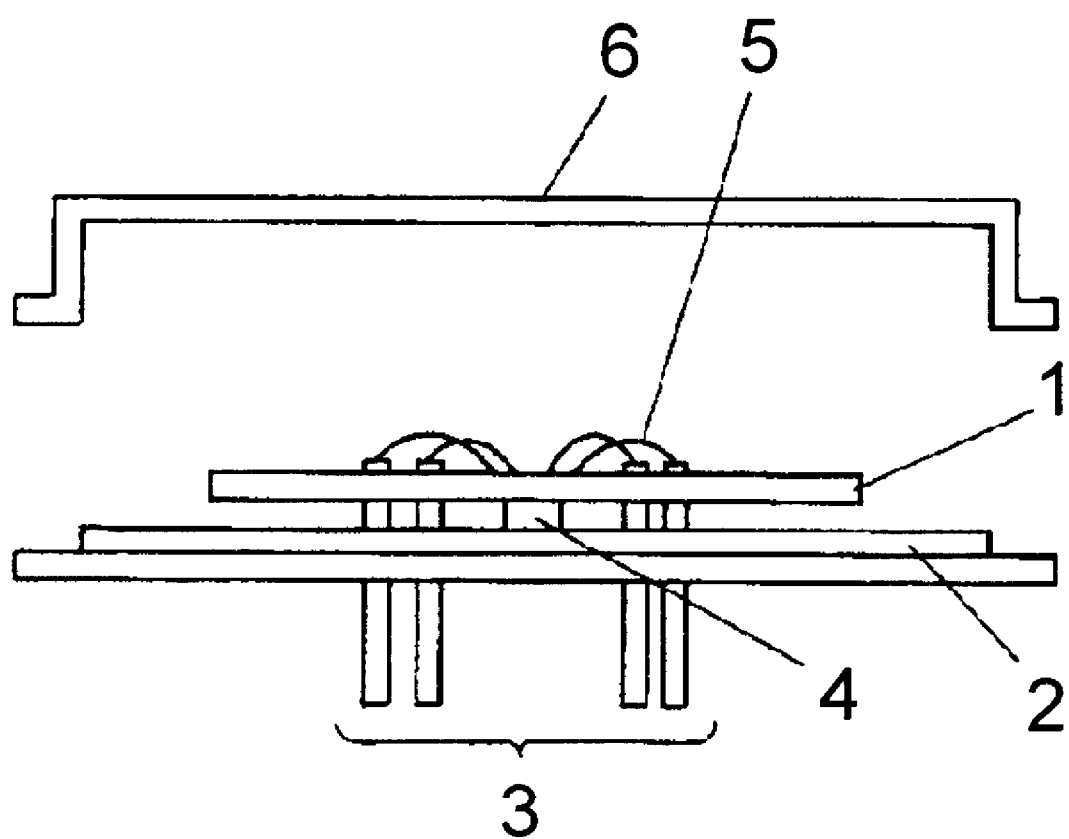
FIG. 2 is a sectional view of the angular velocity sensor.

FIG. 2 is a sectional view of sensor element 1 and airtight plate 2. Airtight plate 2 holds electric terminal 3, providing electrical isolation. Electric terminal 3 is connected, through gold wire 5, to an electric terminal (not shown) disposed on sensor element 1. Spacer 4, which slightly lifts up sensor element 1 from airtight plate 2, is securely bonded to the center of sensor element 1. With such a structure, sensor element 1 is held on airtight plate 2. Cover 6 and airtight plate 2 hermetically seals sensor element 1. Cover 6 is preferably made of an alloy of cobalt, nickel, and iron, having an equal thermal expansion coefficient with airtight plate 2.

Figure 3:
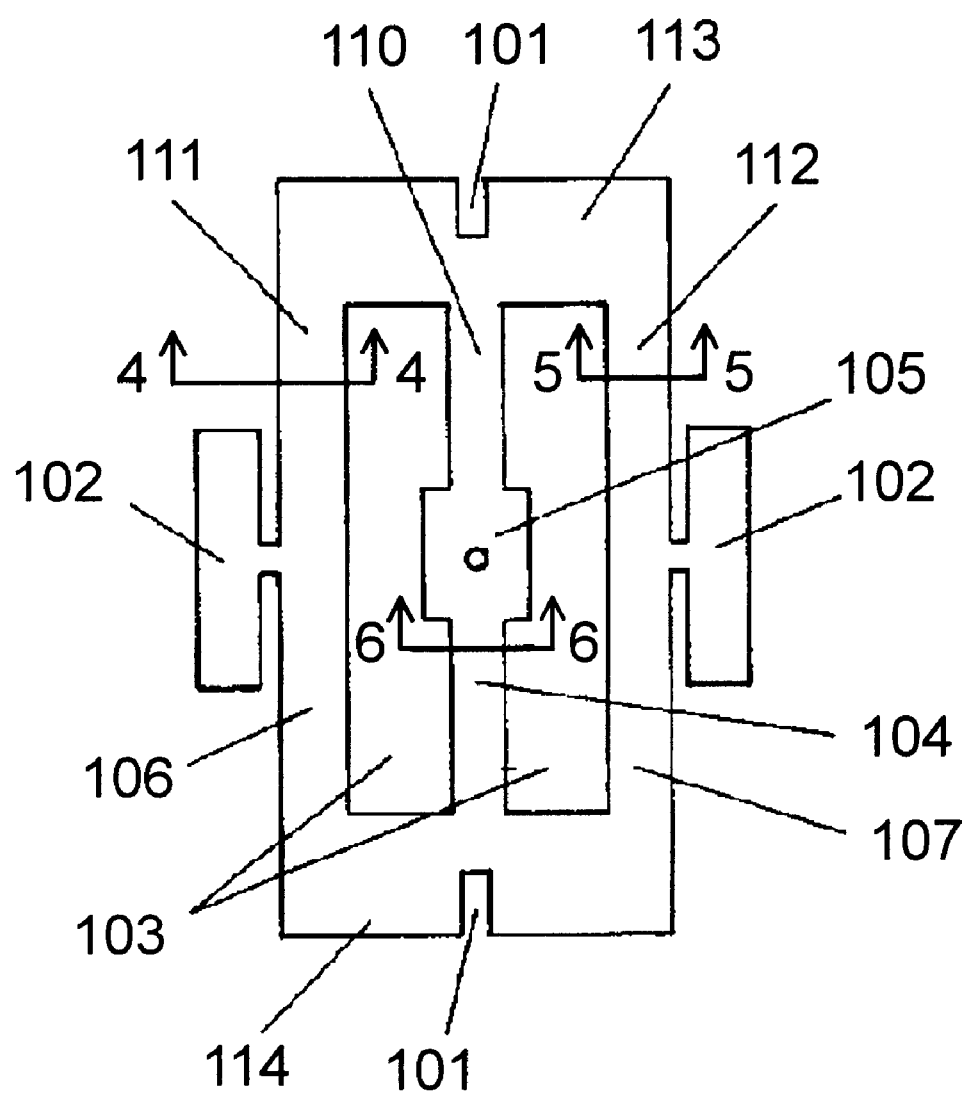
FIG. 3 is a plan view depicting the sensor elements of the angular velocity sensor.

FIG. 3 is a plan view of sensor element 1. In FIG. 3, first beam 110 is held at its mid-portion. At both ends of first beam 110, fourth beam 113 and fifth beam 114 are formed. Second beam 111 and third beam 112 are located parallel to first beam 110. Fourth and fifth beams 113, 114 integrate second and third beams 111, 112 with first beam 110. Notch 101 is disposed at each outer mid-portion of fourth and fifth beams 113, 114.

Additional mass portion 102 is formed on each outer mid-portion of second and third beams 111, 112. The substantially parallel arrangement of first, second, and third beams 110, 111, 112 have cavity 103 therebetween.

In addition, Coriolis force detector 104, sensor mid-supporter 105, and driver 106, and monitor 107 are disposed.

By forming additional mass portion 102 at each mid-portion of second and third beams 111 and 112, a resonance frequency of driver 106 gets closer to that of detector 104. Because additional mass portion 102 works to make the frequencies of second and third beams 111, 112 higher.

For this reason, providing additional mass portion 102 allows the resonance frequency of the second and the third beams to get closer to that of the first beam.

The smaller the difference Δf between the resonance frequencies of driver 106 and detector 104 is, the more sensitive a sensor is. Having the smallest difference Δf, the sensor can work highly sensitive to the Coriolis force.

On the other hand, the difference Δf has a profound effect on responsivity of a sensor. For good responsivity, the difference Δf preferably ranges from 200 Hz to 300 Hz. The difference Δf beyond 300 Hz deteriorates detecting sensitivity for angular velocity.

As described earlier, fourth beam 113 and fifth beam 114 have notch 101 at each outer mid-portion. With the structure, each one end of fourth beam 113 and fifth beam 114 connected with second beam 111 vibrates as a part of second beam 111, similarly, each other end of fourth beam 113 and fifth beam 114 connected with third beam 112 vibrates as a part of third beam 112—second and third beams provide a greater vibration amplitude, by which the sensitivity of a sensor will be greatly improved.

Figure 4:
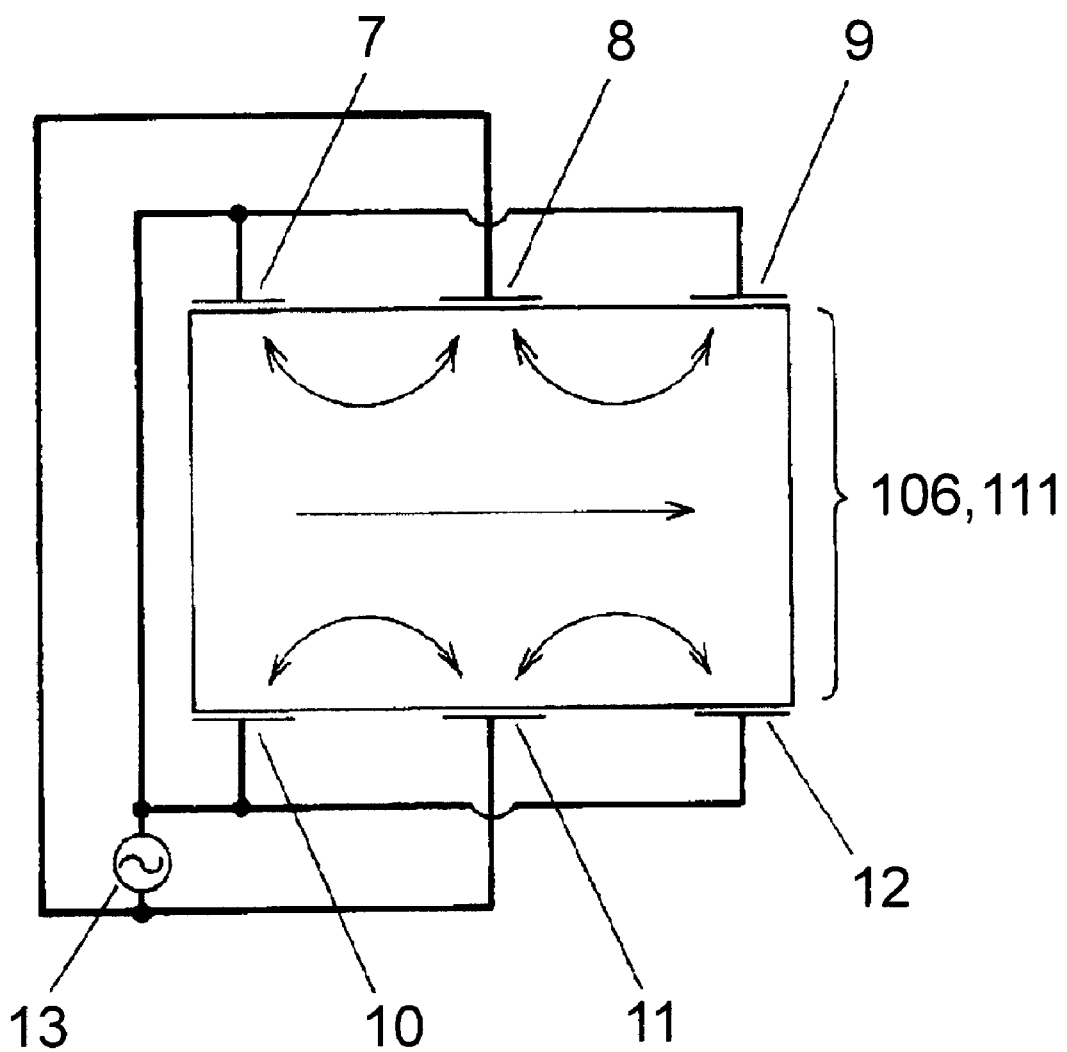
FIG. 4 is a sectional view, taken along line 4—4 of FIG. 3.

FIG. 4 shows driver 106, i.e., a sectional view of second beam 111 taken along line 4—4 in FIG. 3. The rightward arrow in FIG. 4 indicates the electric axis of quartz forming second beam 111. On the upper surface of driver 106, i.e., second beam 111, electrodes 7, 8, and 9 are disposed, while on the lower surface, electrodes 10, 11, and 12 are disposed so that an electric field is applied to the electric axis. Driving circuit 13 applies an alternating field to these electrodes.

Figure 5:
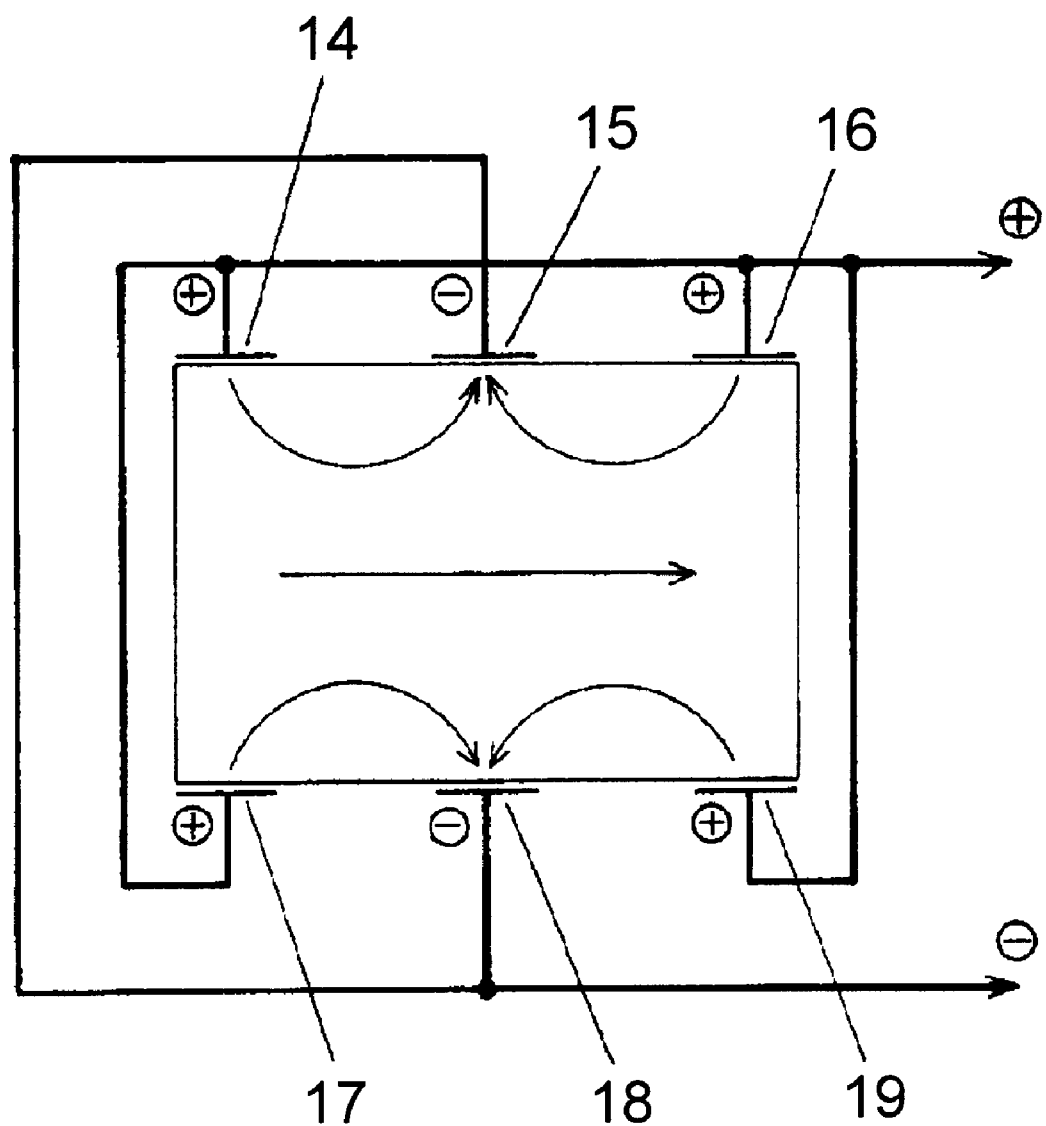
FIG. 5 is a sectional view, taken along line 5—5 of FIG. 3.

FIG. 5 shows monitor 107 of FIG. 3, i.e., a sectional view of third beam 112 taken along line 5—5 in FIG. 3. The straight rightward arrow shows the electric axis of quartz. On the upper surface of monitor 107, i.e., third beam 112, electrodes 14, 15 and 16 are disposed, while electrodes 17, 18, and 19 are disposed on the lower surface, thereby detecting an electrical charge proportional to vibrating amplitude.

Figure 6:
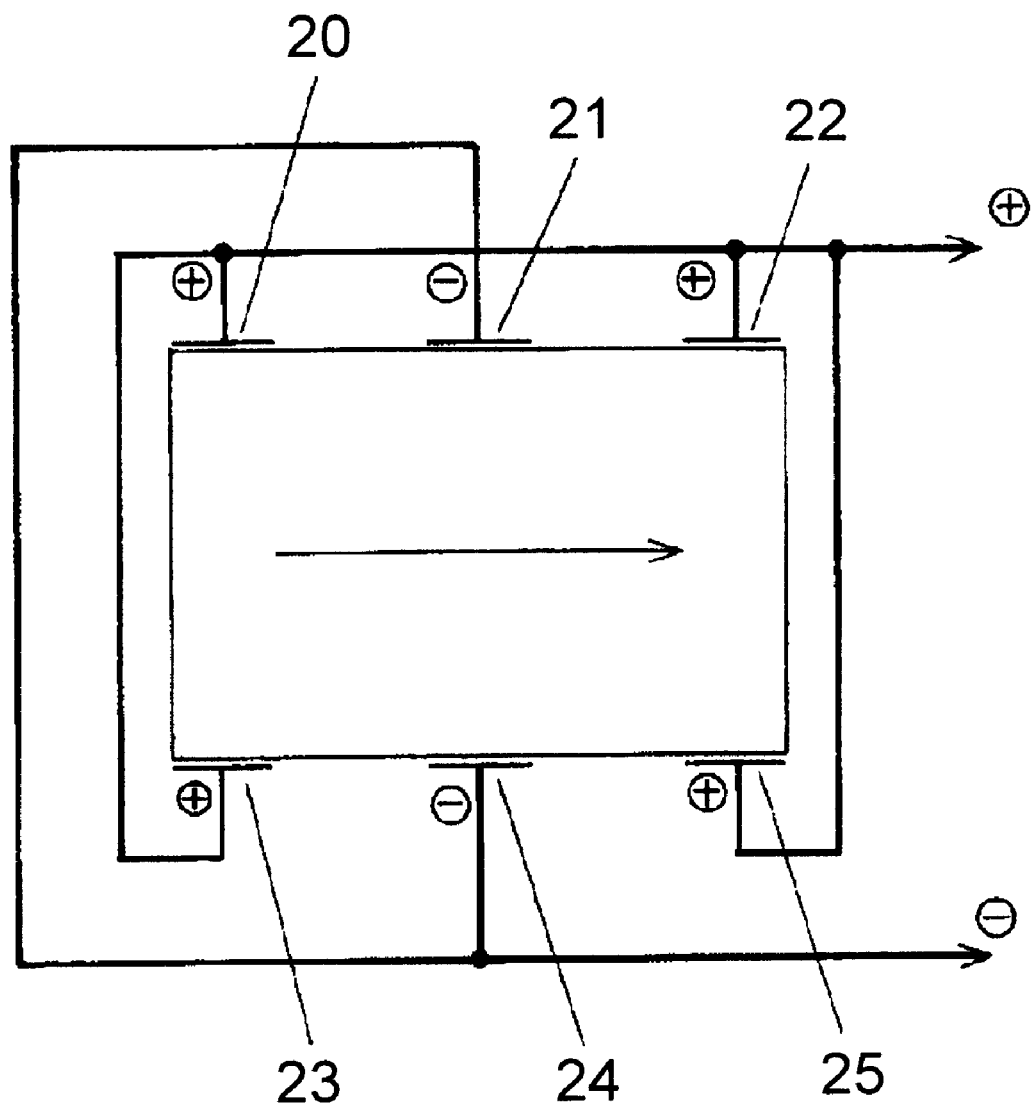
FIG. 6 is a sectional view, taken along line 6—6 of FIG. 3.

FIG. 6 is a sectional view, taken along line 6—6 in FIG. 3, of detector 104 detecting the Coriolis force. Electrodes 20, 21, 22, 23, 24, and 25 detect an electrical charge from an S-shaped bend of Coriolis force-monitor 104, i.e., first beam 110.

Monitor 104 has electrodes separately in each area divided by mid-supporter 105, by which a bend of first beam 110 is detected separately by areas split with mid-supporter 105.

Figure 8:
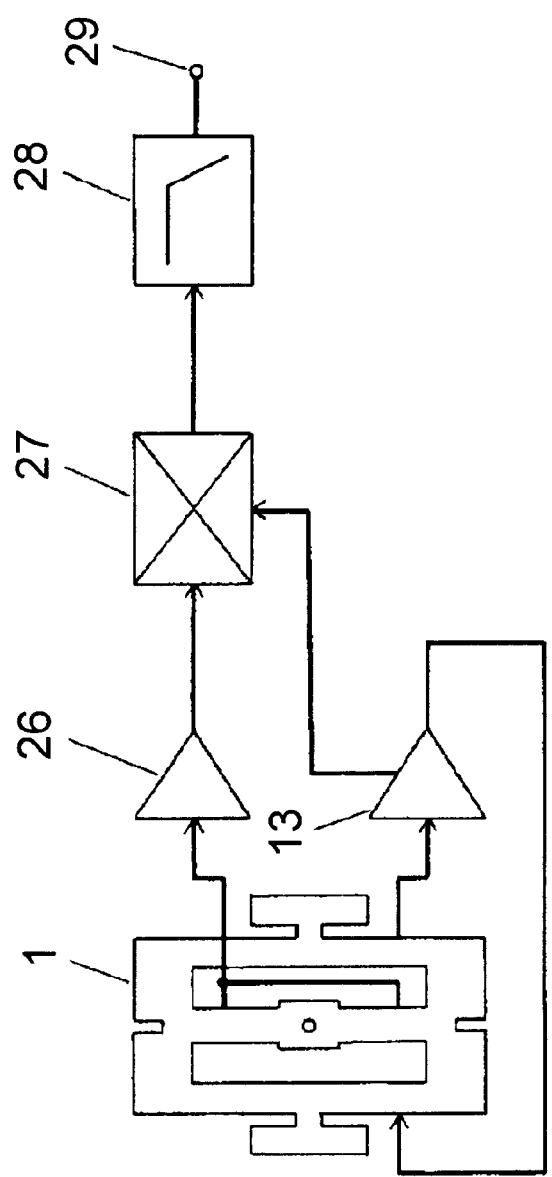
FIG. 8 is a block diagram of a signal processing circuit.

FIG. 8 shows a processing circuit handling signals from the sensor element. Charging amplifier 26 amplifies a signal from sensor element 1, at the same time, retards the phase of the signal by 90 degrees. Driving circuit 13 drives sensor element 1. Detector circuit 27 detects a signal from charging amplifier 26, in synchronization with a driving signal, from driving circuit 13 in order to extract a Coriolis force component for detecting angular velocity. Low-pass filter circuit 28 filters out a driving signal component from the Coriolis force components. Output terminal 29 outputs a signal corresponding to a Coriolis force signal, that is, angular velocity.

Here will be described the principle of operation of the angular velocity sensor of the first preferred embodiment of the present invention.

Now suppose that an alternating signal is applied to electrodes 7 through 12 in FIG. 4. If the direction of the field provided between adjacent electrodes—indicated by double-headed arrows in FIG. 4—is the same as the direction of the electric axis, a field-applied portion will expand in the side-to-side direction viewing the drawing of FIG. 4; otherwise—if the two directions are opposite with each other, the field-applied portion will contract in the side-to-side direction viewing the drawing of FIG. 4.

In other words, applying an alternating signal between the electrodes expands or contracts driver 106, i.e., second beam 111 in its lengthwise direction.

Here will be explained how a beam vibrates with reference to FIG. 7.

As described above, applying an alternating signal to driver 106 expands or contracts second beam 111 in its lengthwise direction. As a result, second beam 111 and third beam 112, which correspond to the longer sides of the rectangle having second, third, fourth, and fifth beams 111, 112, 113, and 114 as its four sides, vibrate from side to side, as indicated by the broken lines in FIG. 7.

When second beam 111 and third beam 112 are vibrating from side to side, through the application of the alternating signal to second beam 111, monitor 107, i.e., third beam 112 expands or contracts in its lengthwise direction. Therefore, through a piezoelectric effect of quartz generates, electrodes 14, 16, 17, and 19 carry positive (negative) electric charge, and electrodes 15 and 18 carry negative (positive) electric charge.

In FIG. 8, a signal according to the change in the electric charges is fed into driving circuit 13. Circuit 13 controls a driving signal so that a signal from monitor 107 remains a steady output, allowing second beam 111 and third beam 112 to have fixed amplitude.

Figure 7:
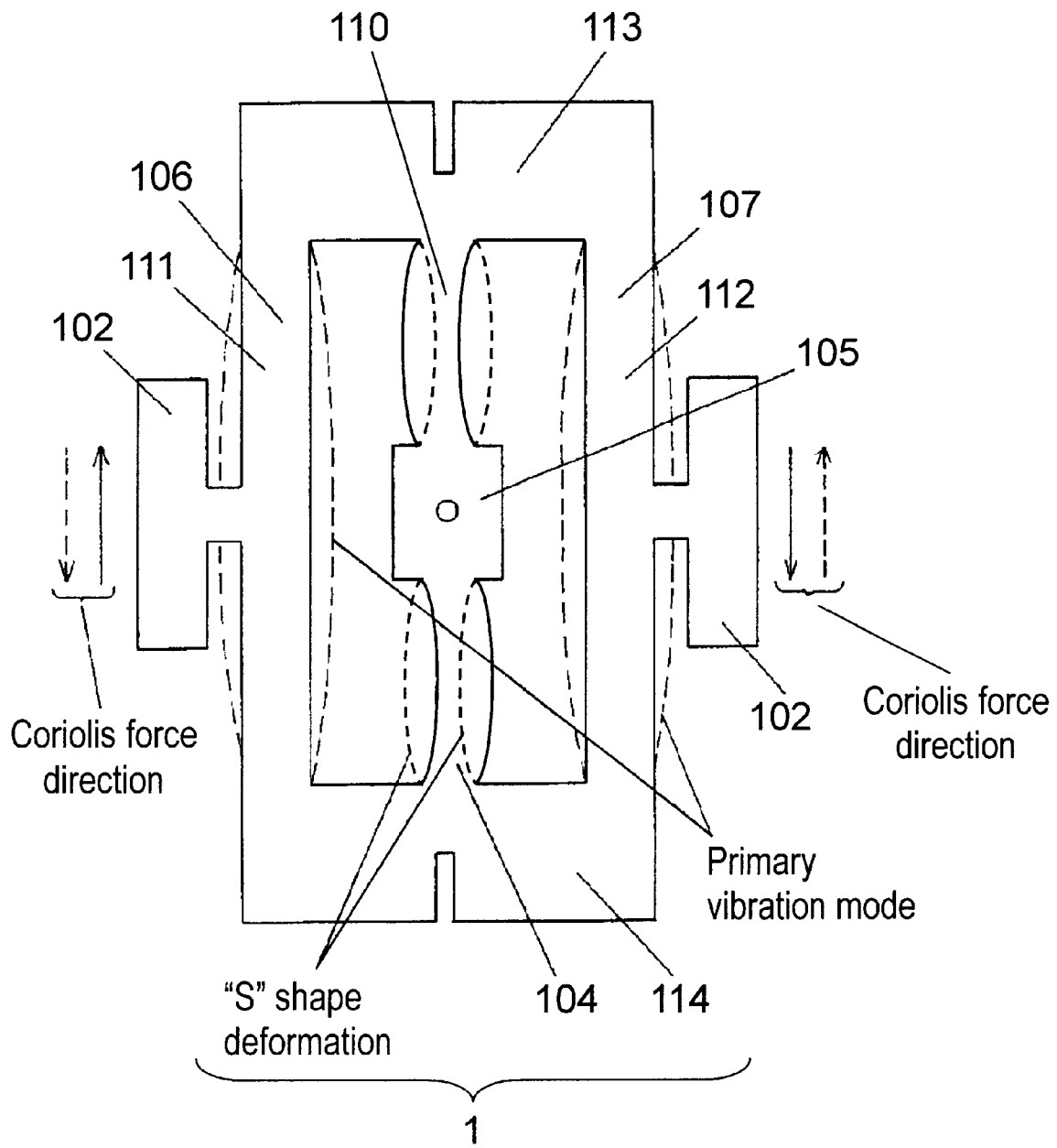
FIG. 7 is a schematic diagram depicting the sensor elements in vibrating state.

If angular velocity is applied around the vertical axis to the paper surface carrying the plan view of FIG. 7, the Coriolis force acts on additional mass portion 102, second beam 111, and third beam 112 in a direction indicated by the solid-lined and dashed-lined arrows in FIG. 7.

The Coriolis force drives the rectangle formed by second, third, fourth, and fifth beams 111, 112, 113, and 114 to rotate about mid-supporter 105, alternating between clockwise and counterclockwise.

According to the movement of the rectangular above, first beam 110 held by mid-supporter 105 vibrates in a S-shape, with mid-holder 105 centered in the "S". Information on angular velocity can be obtained by detecting the S-shaped bend.

In the circuit of FIG. 8, when angular velocity is applied to sensor element 1, the Coriolis force component developed in sensor element 1 is fed into charging amplifier 26. An output signal from charging amplifier 26 is detected, in synchronization to a driving signal, by detector circuit 27. Filter circuit 28 filters out a driving signal component from the detected signals to extract the Coriolis force signal component. In this way, output terminal 29 outputs an angular velocity signal.

The working principle of the sensor above is supported by the facts below:

i) the Coriolis force from angular velocity is proportional to vibrating velocity of sensor element 1; and ii) there is a phase difference of 90 degrees between the Coriolis force signal and the driving signal. Therefore, detection synchronized with the driving signal can extract the Coriolis force component.

According to the structure of the embodiment, as long as the sensor element has no application of angular velocity—even when second and third beams 111, 112 are vibrating from side to side—a driving displacement component does not develop in first beam 110 located between the two beams above. Specifically, the vibration developed in the driving portion does not appear in the detecting portion. In other words, the sensor does not take a driving displacement component for the Coriolis force component.

The monitoring portion has no bend before the Coriolis force develops through the application of angular velocity. It is therefore possible to detect angular velocity with a higher signal-to-noise ratio.

According to the structure, the second and the third beams serving as a driver are symmetrically arranged with respect to the mid-placed first beam. With the arrangement, the first beam is free from vibration, even when the second and the third beams are vibrating.

In the structure, as described above, the vibration of the driving portion has no influence on the first beam serving as a detector. On the application of angular velocity to the periphery of the axis orthogonal to the plane containing the first, the second, and the third beams, the Coriolis force acts on the second and the third beams in each lengthwise direction. Due to the Coriolis force on the mass portion added to the second and the third beams, the first beam bends into S-shape. Information on angular velocity can be obtained by detecting the bend. The vibration developed in the driving portion does not sneak into the monitoring portion with no application of angular velocity, which contributes to detection with high accuracy.

The beams, the additional mass portion, and the mid-supporter holding them are made of an identical piezoelectric vibrating material, such as quartz. This strengthens the mechanical coupling between the driving beam and monitoring beam for greater rigidity. With such a structure, the beams offer a steady vibration and cope with a disturbance vibration, with the result that the angular velocity is detected with high stability.

Additional mass portion 102, as shown in FIG. 3, is formed into T-shape. T-shaped mass portion 102, which vibrates through the application of angular velocity, is subjected to the Coriolis force. This increases the Coriolis force on the second and the third beams, with the sensitivity of the sensor improved.

To drive the beams and detect the Coriolis force, the sensor of the embodiment employs a piezoelectric effect, instead of detecting electrostatic attraction and capacitance—for which a lot of comb-like electrodes are needed. This offers another advantage in going easily into volume production due to its simple structure.

Now will be described the case where an acceleration including a shock works on sensor element 1.

In FIG. 7, when acceleration is applied to sensor element 1 in its left-to-right direction—the direction parallel to fourth and fifth beams 113 and 114, first beam 110 will bend into C-shape in the direction to which the acceleration is applied. By detecting the difference of the signals from the upper half and the lower half—split by sensor mid-holder 105—of beam 110, the signal derived from the acceleration will be canceled out. That is, the influence of the acceleration can be removed out.

With the structure above, the sensor of the embodiment can successfully extract angular velocity signals.

On the other hand, when acceleration is applied to sensor element 1 in its top-to-bottom direction in FIG. 7—the direction parallel to first beam 110, beam 110 is stressed in compression and tension in its lengthwise direction. In this case, too, by detecting the difference between the signal from compression and the signal from tension, the signal derived from the acceleration will be canceled out.

This is also true when the sensor is subjected to acceleration in vertical direction with respect to the paper surface carrying the plan view of FIG. 7 thereon. First beam 110 bends in vertical direction to the paper surface when the acceleration is applied thereto. In this case, too, by detecting the difference the signals from the first beam, the signal from the acceleration will be canceled out.

Hereinafter will be discussed the explanation above in a little more detail.

The first beam works in a vibration mode having S-shaped bend, serving as a detector, while the second and the third beams work in the primary vibration mode.

On the application of external shocks or vibrations, the second and the third beams bend in the primary vibration mode. Then, like the two beams, the first beam serving as the detector of the Coriolis force bends in the primary vibration mode. The first beam, however, has no response to the bend from the primary vibration mode: only responsive to S-shaped bend by outputting signals. The sensor features immunity to external shocks and vibrations.

Figure 9:
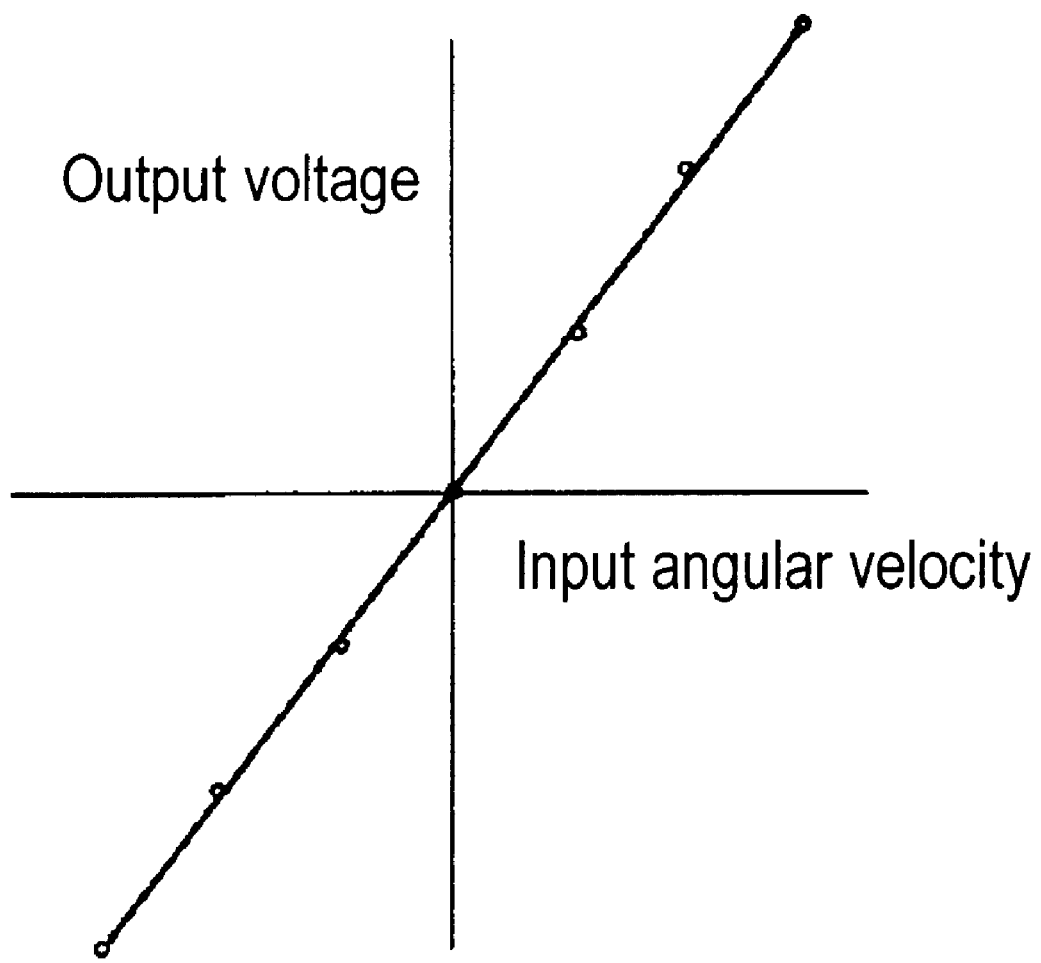
FIG. 9 shows the relation between an input angular velocity and an output signal from the sensor.

FIG. 9 shows the relation between an input angular velocity and an output signal from the sensor according to the circuit configuration shown in FIG. 8 of the embodiment. It is understood that the input angular velocity and the output signal according to the velocity have substantially linear relation.

Second Preferred Embodiment

Figure 10:
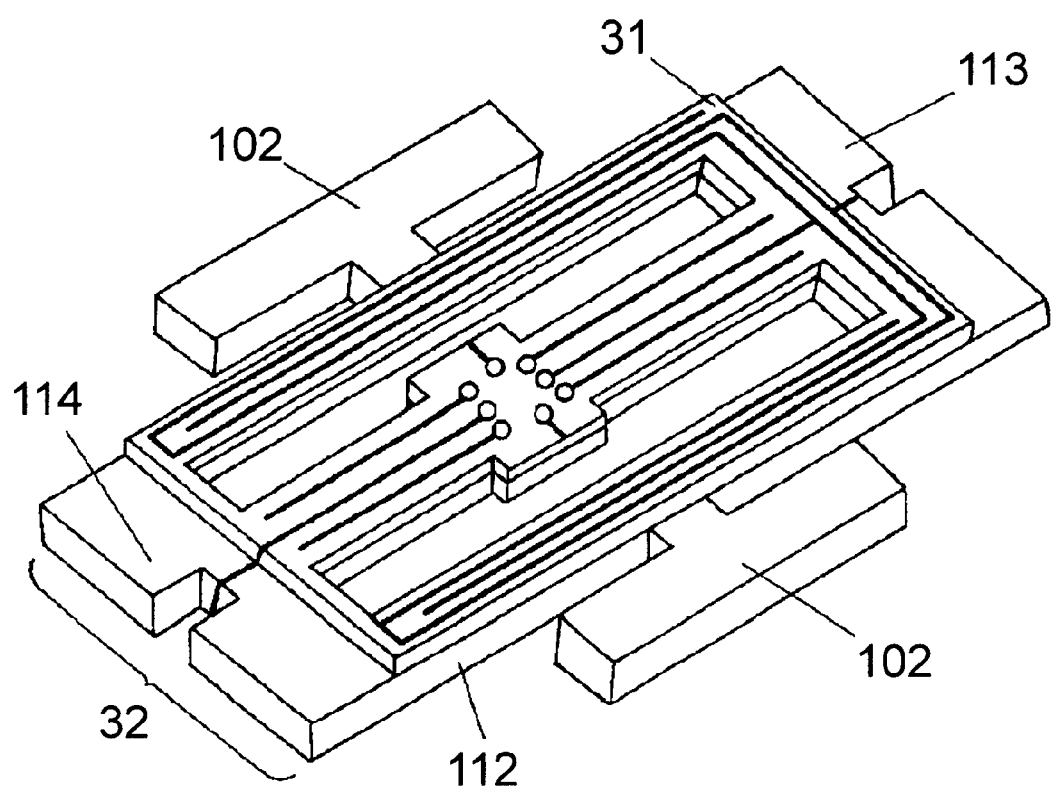
FIG. 10 is a perspective view of the sensor elements in accordance with a second preferred embodiment of the present invention.

FIG. 10 is a perspective view depicting the vibrator of the angular velocity sensor in accordance with the second preferred embodiment of the present invention.

According to the embodiment, the shape of the beams in vibration; how to drive the sensor; and how to detect the Coriolis force are all the same as those of the angular velocity sensor described in the first embodiment. Therefore, the detailed explanations thereof will be omitted. Here will be given the explanation on the structure different from that of the first preferred embodiment.

In FIG. 10, the same numbers are used as in the first preferred embodiment for similar parts, and explanations thereof will be omitted.

Piezoelectric substrate 31 shown in FIG. 10 is made of a piezoelectric ceramics thin plate. Having a square appearance, substrate 31 contains in its interior a cavity having the same shape as cavity 103 of FIG. 3. Substrate 31 is attached on the upper side of vibrator 32, which is made of permanent elastic metal.

The structure in FIG. 10, where vibrator 32 is driven for detecting the Coriolis force from angular velocity, has an electrode arrangement slightly modified from the arrangements illustrated in FIGS. 4 through 6 of the first preferred embodiment.

However, the basic mechanism—expanding and contracting the driver-beams to generate vibrations shown in FIG. 7 for the Coriolis force detection—is the same as that of the first preferred embodiment.

The structure of the embodiment derives a synergistic effect from piezoelectric substrate 31 combined with vibrator 32. That is, the combination of characteristics of vibrator 32 and, good resonance characteristics and piezoelectric constant characteristics offered by each material forming substrate 31 will further improve the sensor characteristics.

Besides, the structure, since employing a ceramics piezoelectric substrate, has another advantage in that the component arrangement can be efficiently taken for driving the beams and detecting the Coriolis force, with the sensor reduced in size.

Although the explanation here is given the case of piezoelectric substrate 31 being disposed on the upper side of vibrator 32 for driving vibrator 32 and detecting the Coriolis force, the same effect can be obtained by a structure with substrate 31 being disposed each on the upper and lower sides of vibrator 32.

In the structure above, a piezoelectric ceramics thin plate is employed for piezoelectric substrate 31. Instead of piezoelectric ceramics, substrate 31 may be made of a single-crystal piezoelectric material and vibrator on which a piezoelectric film is directly formed.

Instead of the permanent elastic metal-made vibrator, an alumina ceramics-made vibrator with piezoelectric ceramics being attached thereon can offer a similar effect.

Third Preferred Embodiment

Figure 11:
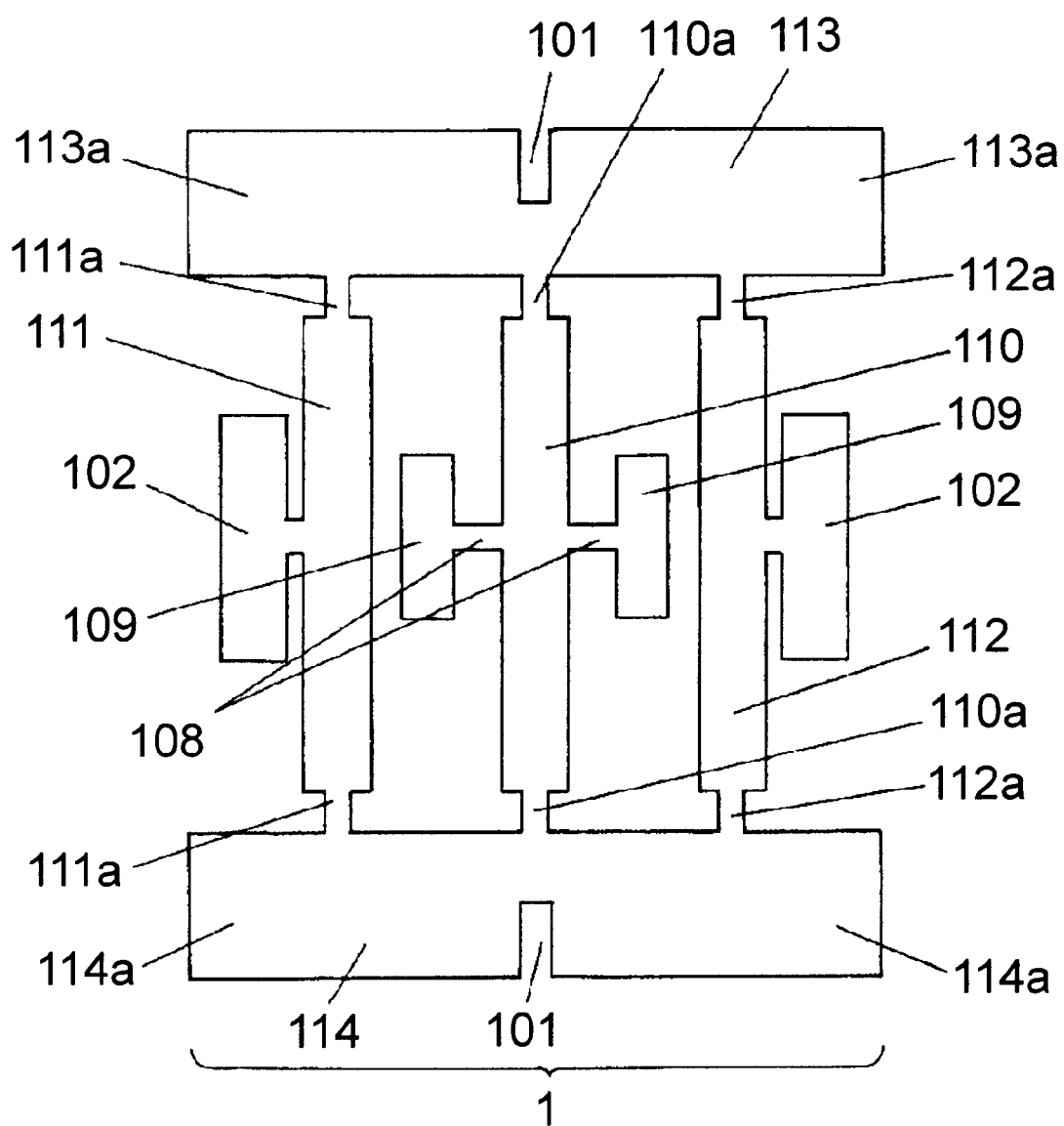
FIG. 11 is a plan view of the sensor elements in accordance with a third preferred embodiment of the present invention.

FIG. 11 is a plan view of the vibrator in accordance with the third preferred embodiment of the present invention. In the vibrator, the same numbers are used as in the previous two embodiments for similar parts, and explanations thereof will be omitted. Here will be given the explanation on the structure different from that of the two embodiments.

In FIG. 11, support beams 108 laterally protrude from the mid-portion of first beam 110. At each tip of support beams 108, holders 109 are formed to hold sensor element 1.

Each of first, second, and third beams 110, 111, and 112 have constrictions 110a, 111a, and 112a, respectively, at its both ends.

Fourth and fifth beams 113, 114 have protrusions 113a, 114a, respectively, at both ends—both of which extend beyond second and third beams 111, 112.

Sensor element 1 is made of quartz, as is that of the first preferred embodiment.

Now will be described how the angular velocity sensor of the embodiment works.

The arrangements of the electrodes for driving and monitoring, and how to detect an angular velocity signal are the same as those in the first preferred embodiment, the explanations thereof will be omitted.

Here will be given the explanation focused on vibrations of the beams and angular velocity detection.

As shown in FIG. 11, fourth and fifth beams 113, 114 have protrusions 113a, 114a, respectively. With the structure, when second and third beams 111, 112 are vibrating in the widthwise direction, mass of each beam is concentrated on the node of vibrations, that is, on extended lines of the second and third beams. This provides second and third beams 111 and 112 with well-balanced vibrations, thereby increasing the sensitivity of the sensor.

Constrictions 111a and 112a, which are formed at both ends of second and third beams 111, 112, respectively, lessen the rigidity of each beam, by which the second and third beams have greater amplitude in vibrations. This also increases the sensitivity of the sensor.

Like second and third beams 111 and 112, first beam 110 has constrictions 110a at both ends. With the structure, as is in beams 111 and 112, the rigidity of first beam 110 lessens, so that the first beam has greater amplitude in vibrations. That is, the first beam can "amplify" a bend from the Coriolis force—another advantage in increasing the sensitivity of the sensor.

Two beams, which are formed at mid-portion of first beam 110, serve as support beams 108 to hold sensor element 1.

The structure allows first beam 110 as the detector beam to have a longer bend length. This also contributes to high sensitivity of the sensor.

Each of Support beams 108 has holder 109 at its tip. Holder 109 is entirely or partly supportively fixed, Holders 109 supportively fix sensor element 1, so that holders 109 can absorb vibrations leaked out from the driving system. Similarly, external vibrations or shocks are partly absorbed by holders 109. The structure therefore can minimize the external vibrations and shocks to the sensor element.

Although the explanations are given in the case where quartz is employed for the sensor element in the first and the third embodiments, the beams may be made of a piezoelectric material, such as ceramics. In this case, selecting a material having a greater coefficient in converting electrical power to mechanical one realizes an efficient component-arrangement for driving the beams and detecting the Coriolis force, thereby downsizing the sensor.

Although the explanations above are given the case where all the beams are made of an identical material, it is not limited to this: the second and the third beams may be made of a piezoelectric material suitable for driving, while the first beam may be the one suitable for detecting.

The sensor element can thus be constituted by the driving member and the detecting member that are made of different piezoelectric materials with each other.

Generally, a material with a great piezoelectric constant has a low sharpness of mechanical resonance—conversely, a material with a small piezoelectric constant offers a high sharpness of mechanical resonance. Taking the characteristics into account, a material with a high mechanical resonance-sharpness is suitable for driving, while a material with a low mechanical resonance-sharpness, i.e., with a great piezoelectric constant is suitable for detecting the Coriolis force. Such a well-combined structure can increase the sensitivity of the sensor.

According to the present invention, as described above, the sensor element contains the first through the fifth beams: the first, the second, and the third beams have a length of the same and are disposed in a parallel arrangement on the same plane—with the first beam placed between the second and the third; the fourth connects each one end of the first through the third, while the fifth connects each other end of them. The middle part of the first beam is supportively fixed. With the structure, a displacement-component of the driven beams is not allowed to mix into the Coriolis force component, that is, the sensor can take out a "genuine" Coriolis force component, providing the detection of angular velocity with high accuracy.

Besides, to drive the beams and detect the Coriolis force, the sensor employs a piezoelectric material, instead of detecting electrostatic attraction and capacitance—for which a lot of comb-like electrodes are needed. This will contribute to a simplified manufacturing process.

What is claimed is:

1. An angular velocity sensor comprising:
   (a) a first beam;
   (b) a second beam, having a length substantially equal to that of the first beam, disposed substantially in parallel to the first beam;
   (c) a third beam, having the length substantially equal to that of the first beam, disposed substantially in parallel to the first beam on an opposite side to the second beam and in the substantially identical plane with the first and the second beams;
   (d) a fourth beam connecting each end of the first, the second, and the third beams; and
   (e) a fifth beam connecting each other end of the first, the second, and the third beam,
      wherein the first beam is supportively fixed at a mid-portion thereof.

2. The angular velocity sensor of claim 1, wherein an additional mass portion is disposed each at a middle of the second and the third beams so that a resonance frequency of the second and the third beams get closer to that of the first beam.

3. The angular velocity sensor of claim 2, wherein the first through the fifth beams, the additional mass portion, and a beam supporter holding the beams and the additional mass portion are made of an identical material and arranged in the substantially identical plane.

4. The angular velocity sensor of claim 3, wherein the additional mass portions disposed on the second and the third beams are substantially T-shaped.

5. The angular velocity sensor of claim 3, wherein each of the fourth and the fifth beams has a notch at each outer mid-portion.

6. The angular velocity sensor of claim 3, wherein the first beam, which vibrates in a S-shaped vibration mode, is used for detecting, while the second and the third beams, which vibrate in a primary vibration mode, are used for driving.

7. The angular velocity sensor of claim 3, wherein lengthwise both ends of the fourth and the fifth beams extend beyond intersections formed with the second and the third beams.

8. The angular velocity sensor of claim 3, a constriction is disposed at a part of the first beam in a portion connected with the fourth and the fifth beams.

9. The angular velocity sensor of claim 3, wherein a constriction is disposed each at a part of the second and the third beams in portions connected with the fourth and the fifth beams.

10. The angular velocity sensor of claim 3, wherein two beams extend outwardly from the mid-portion of the first beam to face toward a mid-portion of the second and the third beams, respectively, and the two beams are supportively fixed at a substantial tip of each beam.

11. The angular velocity sensor of claim 10, wherein each end of the two beams, which is formed at the mid-portion of the first beam, has a holder, at least a part of which is supportively fixed.

12. The angular velocity sensor of claim 3, wherein the identical material forms a piezoelectric substrate.

13. The angular velocity sensor of claim 3, wherein one piezoelectric substrate serving as a driver is disposed on at least one of the second and the third beams, while another piezoelectric substrate serving as a detector disposed on the first beam.

14. The angular velocity sensor of claim 1, wherein the first, the second, the third, the fourth, and the fifth beams are made of piezoelectric ceramics and are attached on a surface of a permanent elastic metal-made vibrator.

* * * * *